US012802048B2

(12) United States Patent
Singh

(10) Patent No.: US 12,802,048 B2
(45) Date of Patent: Nov. 17, 2026

(54) SYSTEM AND METHOD TO MANAGE A CONTRACT BETWEEN A PLURALITY OF PARTIES

(71) Applicant: Ravneet Singh, Coral Springs, FL (US)

(72) Inventor: Ravneet Singh, Coral Springs, FL (US)

(73) Assignee: Ravneet Singh, Coral Springs, FL (US)

( * ) Notice: Subject to any disclaimer, the term of this patent is extended or adjusted under 35 U.S.C. 154(b) by 192 days.

(21) Appl. No.: 18/399,789

(22) Filed: Dec. 29, 2023

(65) Prior Publication Data

US 2025/0217785 A1 Jul. 3, 2025

(51) Int. Cl.
*G06Q 10/40* (2026.01)
*G06Q 20/12* (2012.01)
*G06Q 20/36* (2012.01)
*G06Q 20/38* (2012.01)

(52) U.S. Cl.
CPC ......... *G06Q 10/40* (2026.01); *G06Q 20/1235* (2013.01); *G06Q 20/3672* (2013.01); *G06Q 20/3825* (2013.01); *G06Q 20/3827* (2013.01); *G06Q 20/384* (2020.05); *G06Q 20/389* (2013.01); *G06Q 2220/00* (2013.01)

(58) Field of Classification Search
None
See application file for complete search history.

(56) References Cited

U.S. PATENT DOCUMENTS 11,748,774 B1 9/2023 Dalal
11,757,653 B2 * 9/2023 Thacker ............. G06Q 30/0185 713/176
12,026,697 B2 * 7/2024 Polasa .................. G06Q 20/363
2016/0188713 A1 * 6/2016 Green .................... G06Q 50/01 707/738
2016/0300252 A1 * 10/2016 Frank ................. G06Q 30/0203
(Continued)

FOREIGN PATENT DOCUMENTS

EP 4062646 A1 9/2022

OTHER PUBLICATIONS

P. K. Bhusare, B. M. R. Mannem and A. P. K, "Decentralised Social Media," 2023 2nd International Conference on Vision Towards Emerging Trends in Communication and Networking Technologies (ViTECoN), Vellore, India, 2023, pp. 1-6, doi: 10.1109/ViTECoN58111.2023.10157136 (Year: 2023).*

*Primary Examiner* — Eduardo Castilho
(74) *Attorney, Agent, or Firm* — Jason C. Cameron

(57) ABSTRACT

A system to manage a contract between a plurality of parties is disclosed. The system includes a processing subsystem including a contract generation module to generate a contract between parties. The contract includes predefined conditions. The parties includes a brand, an influencer and followers. The processing subsystem includes a compliance module to invoke the predefined conditions based on at least one of a geographical location of the influencer, and a type of the influencer. The compliance module is to evaluate an advertisement revenue based on the predefined conditions, and an engagement score of a social media post made by the influencer. The compliance module is to generate second non fungible tokens based on the advertisement revenue to append the same into the blockchain network. The processing subsystem includes a transaction module to issue a receipt of a transaction upon performing a transaction.

16 Claims, 4 Drawing Sheets

(56) References Cited

U.S. PATENT DOCUMENTS

| | | | | |
|---|---|---|---|---|
| 2020/0005284 | A1* | 1/2020 | Vijayan | G06Q 20/065 |
| 2020/0273048 | A1* | 8/2020 | Andon | G06Q 20/045 |
| 2021/0281410 | A1* | 9/2021 | Hain | G06Q 20/3827 |
| 2022/0301040 | A1* | 9/2022 | Senthil | G06Q 20/102 |
| 2022/0358418 | A1* | 11/2022 | Salik | G06Q 20/3224 |
| 2022/0358578 | A1* | 11/2022 | Sliwka | G06Q 20/3825 |
| 2022/0366494 | A1* | 11/2022 | Cella | G06Q 20/401 |
| 2022/0374902 | A1* | 11/2022 | Sabintsev | G06Q 20/3676 |
| 2023/0079195 | A1* | 3/2023 | Matheson | G06Q 20/0655<br>705/44 |
| 2023/0092488 | A1* | 3/2023 | Jenson | G06Q 10/063114<br>707/722 |
| 2023/0224306 | A1* | 7/2023 | Singh | H04L 63/12<br>726/4 |
| 2023/0245247 | A1 | 8/2023 | Xiong | |
| 2023/0259982 | A1* | 8/2023 | Landers | G06Q 30/0273<br>705/14.69 |
| 2023/0385966 | A1* | 11/2023 | Hegardh | G06Q 50/18 |
| 2024/0420130 | A1* | 12/2024 | Ramde | G06Q 20/38215 |
| 2024/0420262 | A1* | 12/2024 | Kusch | G06Q 50/18 |
| 2025/0077625 | A1* | 3/2025 | Coleman | G06F 21/1014 |

* cited by examiner

SYSTEM AND METHOD TO MANAGE A CONTRACT BETWEEN A PLURALITY OF PARTIES

FIELD OF INVENTION

Embodiments of the present disclosure relate to a field of data processing and more particularly to a system and a method to manage a contract between a plurality of parties.

BACKGROUND

A contract is a legally binding agreement between a plurality of parties which outlines rights and obligations of each party. The plurality of parties may include an influencer, a brand, and one or more followers in the realm of social media platforms. The brand engages with the influencer through the contract to promote the brand through social media posts created by the influencer. In return, the influencer gets paid by the brand. The contract between the brand and the influencer may include scope of work, content guidelines, exclusivity, timeline, payment terms, usage rights, performance metrics, compliance conditions, termination conditions, dispute resolution conditions, and service details.

Currently, the contract between the plurality of parties is being drafted and signed offline, requiring the plurality of parties to be physically present during the process. Difficulties in finding mutually agreeable clauses between the plurality of parties may further make the process laborious. Furthermore, revenue-sharing clauses based on specific preferences make enforcement of the contract complex. Also, existing systems lack transparency and accountability during revenue sharing.

Hence, there is a need for an improved system and method to manage a contract between a plurality of parties to address the aforementioned issue(s).

BRIEF DESCRIPTION

In accordance with an embodiment of the present disclosure, a system to manage a contract between a plurality of parties is provided. The system includes processing subsystem hosted on a server and configured to execute on a network to control bidirectional communications among a plurality of modules. The processing subsystem includes a contract generation module configured to generate a contract between the plurality of parties based on one or more preferences provided by the plurality of parties and a plurality of information fetched from at least one of a contract database, an appending database, and a search engine database associated with at least one of the plurality of parties. The contract includes one or more predefined conditions. The plurality of parties includes a brand, an influencer and one or more followers. The contract generation module is also configured to receive corresponding electronic signatures from the plurality of parties to create a signed contract. The contract generation module is further configured to generate one or more first non-fungible tokens based on a hash value of the signed contract to append the signed contract in a blockchain network. The processing subsystem also includes a compliance module operatively coupled to the contract generation module. The compliance module is configured to invoke the one or more predefined conditions based on at least one of a geographical location of the influencer, and a type of the influencer. The compliance module is also configured to evaluate an advertisement revenue based on the one or more predefined conditions, and an engagement score of a social media post made by the influencer. The compliance module is further configured to generate one or more second non fungible tokens based on the advertisement revenue evaluated to append the one or more second non-fungible tokens into the blockchain network. The processing subsystem also includes a transaction module operatively coupled to the compliance module. The transaction module is configured to issue a receipt of a transaction to the plurality of parties upon performing a transaction associated with the one or more second nonfungible tokens by the plurality of parties, thereby managing the contract between the plurality of parties.

In accordance with another embodiment of the present disclosure, a method to manage a contract between a plurality of parties is provided. The method includes generating, by a contract generation module, a contract between the plurality of parties based on one or more preferences provided by the plurality of parties and a plurality of information fetched from at least one of a contract database, an appending database, and a search engine database associated with at least one of the plurality of parties. The contract includes one or more predefined conditions. The plurality of parties includes a brand, an influencer and one or more followers. The method also includes receiving, by the contract generation module, corresponding electronic signatures from the plurality of parties to create a signed contract. The method also includes generating, by the contract generation module, one or more first non-fungible tokens based on a hash value of the signed contract to append the signed contract in a blockchain network. The method also includes invoking, by a compliance module, the one or more predefined conditions based on at least one of a geographical location of the influencer, and a type of the influencer. The method also includes evaluating, by the compliance module, an advertisement revenue based on the one or more predefined conditions, and an engagement score of a social media post made by the influencer. The method also includes generating, by the compliance module, one or more second non fungible tokens based on the advertisement revenue evaluated to append the one or more non-fungible tokens into the blockchain network. The method further includes issuing, by a transaction module, a receipt of a transaction to the plurality of parties upon performing a transaction associated with the one or more second nonfungible tokens by the plurality of parties, thereby managing the contract between the plurality of parties.

In accordance with another embodiment of the present disclosure, a non-transitory computer-readable medium storing a computer program that, when executed by a processor, causes the processor to perform a method to manage a contract between a plurality of parties is provided. The method includes generating, by a contract generation module, a contract between the plurality of parties based on one or more preferences provided by the plurality of parties and a plurality of information fetched from at least one of a contract database, an appending database, and a search engine database associated with at least one of the plurality of parties. The contract includes one or more predefined conditions. The plurality of parties includes a brand, an influencer and one or more followers. The method also includes receiving, by the contract generation module, corresponding electronic signatures from the plurality of parties to create a signed contract. The method also includes generating, by the contract generation module, one or more first non-fungible tokens based on a hash value of the signed contract to append the signed contract in a blockchain network. The method also includes invoking, by a compliance module, the one or more predefined conditions based on at least one of a geographical location of the influencer, and a type of the influencer. The method also includes evaluating, by the compliance module, an advertisement revenue based on the one or more predefined conditions, and an engagement score of a social media post made by the influencer. The method also includes generating, by the compliance module, one or more second non fungible tokens based on the advertisement revenue evaluated to append the one or more non-fungible tokens into the blockchain network. The method further includes issuing, by a transaction module, a receipt of a transaction to the plurality of parties upon performing a transaction associated with the one or more second nonfungible tokens by the plurality of parties, thereby managing the contract between the plurality of parties.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
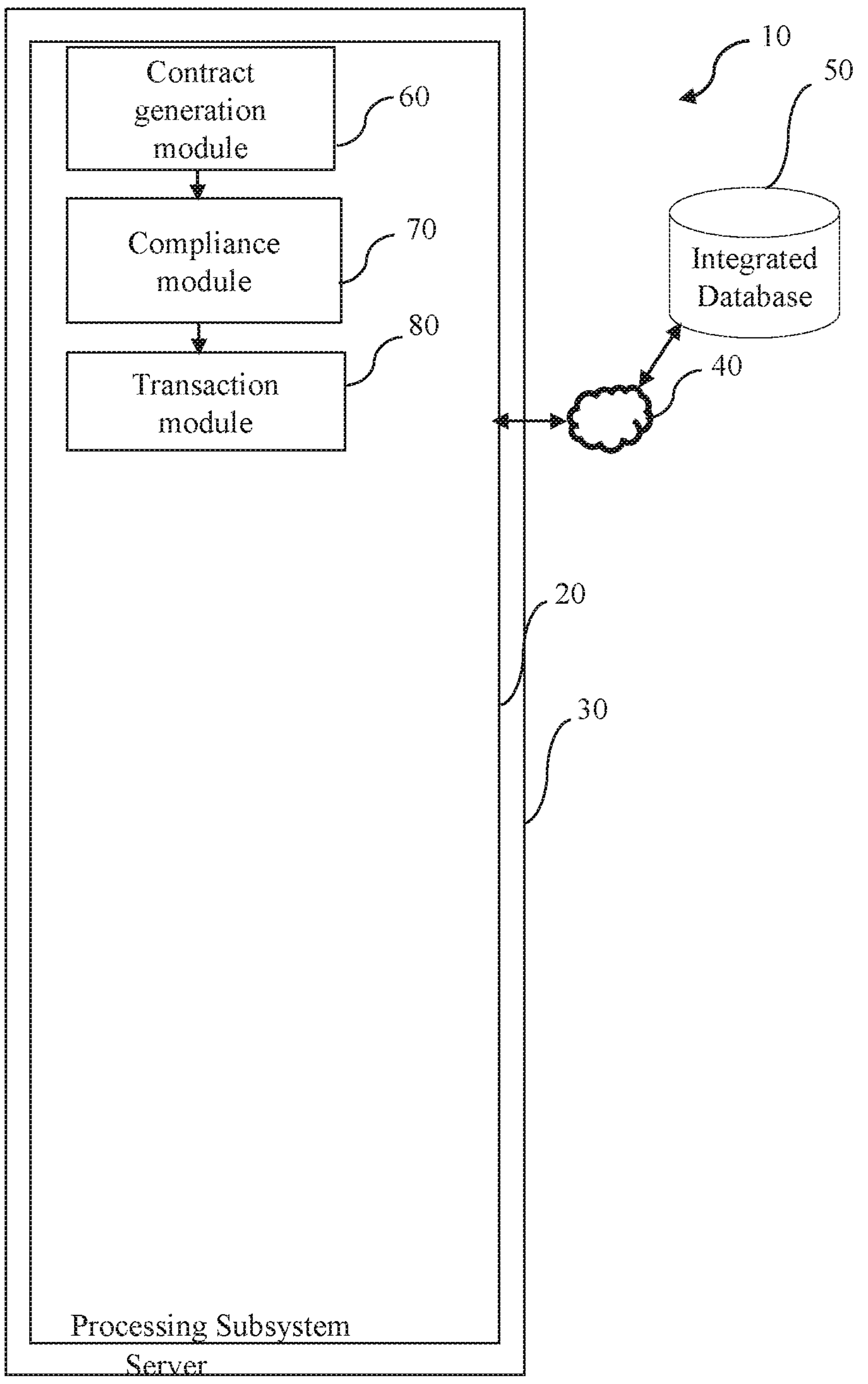
FIG. 1 is a block diagram representation of a system to manage a contract between a plurality of parties in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to manage a contract between a plurality of parties. The system includes processing subsystem hosted on a server and configured to execute on a network to control bidirectional communications among a plurality of modules. The processing subsystem includes a contract generation module configured to generate a contract between the plurality of parties based on one or more preferences provided by the plurality of parties and a plurality of information fetched from at least one of a contract database, an appending database, and a search engine database associated with at least one of the plurality of parties. The contract includes one or more predefined conditions. The plurality of parties includes a brand, an influencer and one or more followers. The contract generation module is also configured to receive corresponding electronic signatures from the plurality of parties to create a signed contract. The contract generation module is further configured to generate one or more first non-fungible tokens based on a hash value of the signed contract to append the signed contract in a blockchain network. The processing subsystem also includes a compliance module operatively coupled to the contract generation module. The compliance module is configured to invoke the one or more predefined conditions based on at least one of a geographical location of the influencer, and a type of the influencer. The compliance module is also configured to evaluate an advertisement revenue based on the one or more predefined conditions, and an engagement score of a social media post made by the influencer. The compliance module is further configured to generate one or more second non fungible tokens based on the advertisement revenue evaluated to append the one or more second non-fungible tokens into the blockchain network. The processing subsystem also includes a transaction module operatively coupled to the compliance module. The transaction module is configured to issue a receipt of a transaction to the plurality of parties upon performing a transaction associated with the one or more second nonfungible tokens by the plurality of parties, thereby managing the contract between the plurality of parties.

FIG. 1 is a block diagram representation of a system 10 to manage a contract between a plurality of parties in accordance with an embodiment of the present disclosure. The system 10 includes a processing subsystem 20 hosted on a server 30 and configured to execute on a network 40 to control bidirectional communications among a plurality of modules. In one embodiment, the plurality of modules may be associated with an integrated database 50 to store data being handled by the plurality of modules. In one embodiment, the integrated database 50 may include a structured query language database. In some embodiments, the integrated database 50 may include a non-structured query language database. Further, in one embodiment, the server 30 may be a cloud-based server. In another embodiment, the server 30 may be a local server. In one example, the network 40 may be a private or public local area network (LAN) or wide area network (WAN), such as the Internet.

Further, in another embodiment, the network 40 may include both wired and wireless communications according to one or more standards and/or via one or more transport mediums. Furthermore, in one example, the network 40 may include wireless communications according to one of the 802.11 or Bluetooth specification sets, or another standard or proprietary wireless communication protocol. In yet another embodiment, the network 40 may also include communications over a terrestrial cellular network, including, a GSM (global system for mobile communications), CDMA (code division multiple access), and/or EDGE (enhanced data for global evolution) network.

Furthermore, the processing subsystem 20 includes a contract generation module 60 configured to generate a contract between the plurality of parties based on one or more preferences provided by the plurality of parties and a plurality of information fetched from at least one of a contract database, an appending database, and a search engine database associated with at least one of the plurality of parties. The plurality of parties includes a brand, an influencer and one or more followers. In one embodiment, the contract may include a copyright contract between the brand and the influencer, a membership contract between the one or more followers and the influencer, and a royalty sharing contract between the brand, the influencer, and the one or more followers. In one embodiment, the contract database, the appending database, and the search engine database may be subunits of the integrated database 50.

Additionally, in one embodiment, the one or more preferences may include scope of work, content guidelines, exclusivity, timeline, payment terms, copyright terms, licensing terms, terms of repurposing content of the social media post, usage rights, performance metrics, compliance condition, termination condition, moral clauses, dispute resolution condition, service details. In a specific embodiment, the contract database may include the plurality of information about a plurality of terms comprising influencer, copyrights, brand Ambassador, currency, non-disclosure agreements, non-fungible tokens, minting, payouts, taxes, general data protection regulation, cookies, health inductance portability, and payment card industry data security standard, contract creator payment terms, approval process. confidential information, exclusivity rights. governing laws, applicable laws, ftc guidelines. In one embodiment, the contract generation module 60 may utilize a machine learning model trained on a diverse set of contracts including various industries and types of agreements to generate the contract based on the one or more preferences of the plurality of parties.

Also, in one embodiment, the appending database may include information regarding one or more application programming interfaces. In such an embodiment, the one or more application programming interfaces may be capable of fetching the plurality of information from one or more legal databases. In some embodiments, the search engine database includes a plurality of hashtags aggregated from one or more social media platforms associated with the influencer through an aggregator. The contract includes one or more predefined conditions. In one embodiment, the one or more predefined conditions may include, but are not limited to, the scope of work, the content guidelines, the exclusivity, the timeline, the payment terms, the copyright terms, trademark terms, the usage rights, the performance metrics, the compliance condition, the termination condition, the dispute resolution condition, and the service details.

Moreover, consider a scenario in which a brand X and the influencer Y may have connected each other through respective user profiles in the integrated database 50. The brand X may be interested to engage in the contract with the influencer Y to promote the brand X by paying certain amount to the influencer Y. The contract generation module 60 may receive one or more preferences of the brand X through a user interface associated with the brand X. The one or more preferences of the brand X may include the scope of work, the payment terms, and the termination conditions. The one or more preferences of the influencer Y may include the copyright terms. The contract generation module 60 may generate the contract between the brand X and the influencer Y based on the one or more preferences received from the brand X and the influencer Y.

Further, the contract generation module 60 may utilize the plurality of information regarding the plurality of terms stored in the contract database while generating the contract. The plurality of terms may be associated with the one or more preferences received from the brand X and the influencer Y and the plurality of information may include corresponding definition of the plurality of terms, and a legal interpretation of the plurality of terms. Similarly, the contract generation module 60 may fetch the plurality of information from the one or more application programming interfaces utilizing the information regarding the one or more application programing interfaces stored in the appending database. Also, the contract generation module 60 may utilize the one or more tags stored in the search engine database to build a context of social media activities of the influencer Y.

Furthermore, the contract generation module 60 is also configured to receive corresponding electronic signatures from the plurality of parties to create a signed contract. The contract generation module 60 is further configured to generate one or more first non-fungible tokens based on a hash value of the signed contract to append the signed contract in a blockchain network. In one embodiment, the blockchain network may include a public blockchain network. In some embodiments, the blockchain network may include a private blockchain network. In one embodiment, the blockchain network may include a shared blockchain network.

Also, in continuation with the ongoing example, the contract generation module 60 may prompt for the corresponding electronic signatures from the brand X and the influencer Y to create the signed contract upon generating the contract which is mutually agreeable between the brand X and the influencer Y. The contract generation module 60 may generate the one or more first non-fungible tokens based on the hash value of the signed contract to append the signed contract on the blockchain network. In one embodiment, the contract generation module 60 may terminate the signed contract upon receiving an input from at least one of the brand, the influencer and the follower.

Further, the processing subsystem 20 also includes a compliance module 70 operatively coupled to the contract generation module 60. The compliance module 70 is configured to invoke the one or more predefined conditions based on at least one of a geographical location of the influencer, and a type of the influencer. In one embodiment, the compliance module 70 may invoke the one or more predefined conditions based on local governing laws. In some embodiments, the compliance module 70 may invoke the one or more predefined conditions based on an input received from a third party. In detail, consider a scenario in which, the social media post made by the influencer may feature the third party. The compliance module 70 may invoke the one or more predefined conditions based on the input received from the third party. The input may include at least one of a consent, and a refusal provided by the third party based on payment of the predefined amount. In one embodiment, the type of the influencer may include macro influencer, micro influencer, nano influencer, celebrity influencer, industry influencer, lifestyle influencer, fashion influencer, fitness influencer, travel influencer, parenting influencer, food influencer, gaming influencer, political influencer.

Furthermore, in continuation with the ongoing example, consider a scenario in which, the agreement includes a clause outlining the payment terms based on the geographical location of the influencer Y. The compliance module 70 may fetch at least one of the geographical location of the influencer B 110 based on an input from a user device associated with the influencer Y. Consider a scenario in which the influence Y may be promoting the brand X in India as well as in Dubai. The compliance module 70 may invoke the one or more predefined conditions based on the geographical location of the influencer Y.

Moreover, the compliance module 70 is also configured to evaluate an advertisement revenue based on the one or more predefined conditions, and an engagement score of a social media post made by the influencer. The compliance module 70 is further configured to generate one or more second non fungible tokens based on the advertisement revenue evaluated to append the one or more second non-fungible tokens into the blockchain network. In one embodiment, the compliance module 70 may be configured to evaluate the engagement score of the social media post based on number of likes secured by the social media post including a plurality of hash tags, number of comments secured by the social media post including the plurality of hash tags, number of shares secured by the social media post including the plurality of hash tags, and number of impressions secured by the social media post including the plurality of hash tags. In one embodiment, the plurality of hash tags may be created by the influencer Y while creating the social media post by the influencer Y.

Additionally, in continuation with the ongoing example, compliance module 70 may evaluate the advertisement revenue based on the one or more predefined conditions, and the engagement score of the social media post made by the influencer Y to promote the brand X. The compliance module 70 may further generate the one or more second non-fungible tokens to append the one or more second non-fungible tokens into the blockchain network.

Further, the processing subsystem 20 includes a transaction module 80 operatively coupled to the compliance module 70. The transaction module 80 is configured to issue a receipt of a transaction to the plurality of parties upon performing a transaction associated with the one or more second nonfungible tokens by the plurality of parties, thereby managing the contract between the plurality of parties. In some embodiments, the transaction may include a bulk transaction, a lumpsum transaction, and the like. In one embodiment, the receipt may include a plurality of information including status of the transaction, quantify of the one or more non fungible tokens ordered by the influencer, status of an order, order schedule, quantify of the one or more non fungible tokens appended to the blockchain network. In continuation to the ongoing example, consider a scenario in which, the influencer Y may withdraw the one or more non fungible tokens appended in the blockchain network and the transaction module 80 may issue the receipt of the transaction regarding the withdrawal to the influencer Y.

Figure 2:
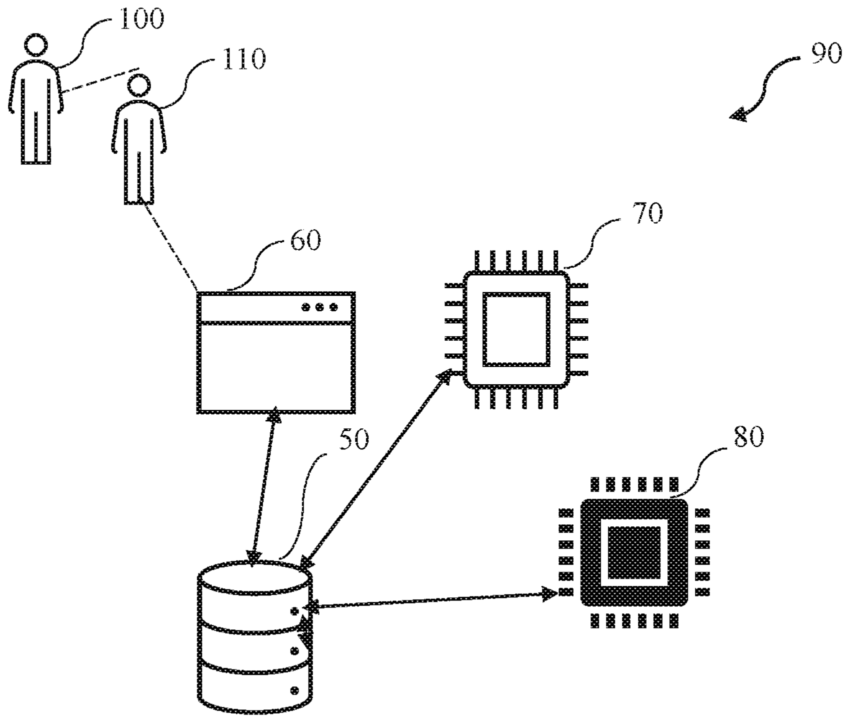
FIG. 2 is a schematic representation of an exemplary embodiment of the system of FIG. 1, in accordance with an embodiment of the present disclosure.

FIG. 2 is a schematic representation of an exemplary embodiment 90 of the system 10 of FIG. 1 in accordance with an embodiment of the present disclosure. For example, consider a scenario in which a brand A 100 and the influencer B 110 may have connected each other through respective user profiles in the integrated database 50. The brand A 100 may be interested to engage in the contract with the influencer B 110 to promote the brand A 100 by paying the influencer B 110. The contract generation module 60 may receive one or more preferences of the brand A 100 through the user interface associated with the brand A 100. The one or more preferences of the brand A 100 may include the scope of work, the payment terms, and the termination conditions.

Further, the one or more preferences of the influencer B 110 may include the copyright terms. The contract generation module 60 may generate the contract between the brand A 100 and the influencer B 110 based on the one or more preferences received from the brand A 100 and the influencer B 110. The contract generation module 60 may utilize the plurality of information regarding the plurality of terms stored in the contract database while generating the contract. The plurality of terms may be associated with the one or more preferences received from the brand A 100 and the influencer B 110 and the plurality of information may include corresponding definition of the plurality of terms, and a legal interpretation of the plurality of terms. Similarly, the contract generation module 60 may fetch the plurality of information from the one or more application programming interfaces utilizing the information regarding the one or more application programing interfaces stored in the appending database.

Also, the contract generation module 60 may utilize the one or more tags stored in the search engine database to build a context of social media activities of the influencer B 110. The contract generation module 60 may prompt for the corresponding electronic signatures from the brand A 100 and the influencer B 110 to create the signed contract upon generating the contract which is mutually agreeable between the brand A 100 and the influencer B 110. The contract generation module 60 may generate the one or more non-fungible tokens based on the hash value of the signed contract to append the signed contract on the blockchain network. Consider a scenario in which, the agreement includes the clause outlining the payment terms based on the geographical location of the influencer B 110. The compliance module 70 may fetch at least one of the geographical location of the influencer B 110 based on an input from the user device associated with the influencer B 110.

Moreover, consider a scenario in which the influencer is promoting the brand A 100 in UK and USA. The compliance module 70 may invoke the one or more predefined conditions based on the geographical location of the influencer B 110. Compliance module 70 may evaluate the advertisement revenue based on the one or more predefined conditions, and the engagement score of the social media post made by the influencer B 110 to promote the brand A 100. The advertisement revenue may be the amount that may be paid by the brand A 100 to the influencer B 110. The compliance module 70 may further generate the one or more second non-fungible tokens to append the one or more second non-fungible tokens into the blockchain network. Consider a scenario in which, the influencer B 110 may withdraw the one or more non fungible tokens appended in the blockchain network and the transaction module 80 may issue the receipt of the transaction regarding the withdrawal to the influencer B 110.

Figure 3:
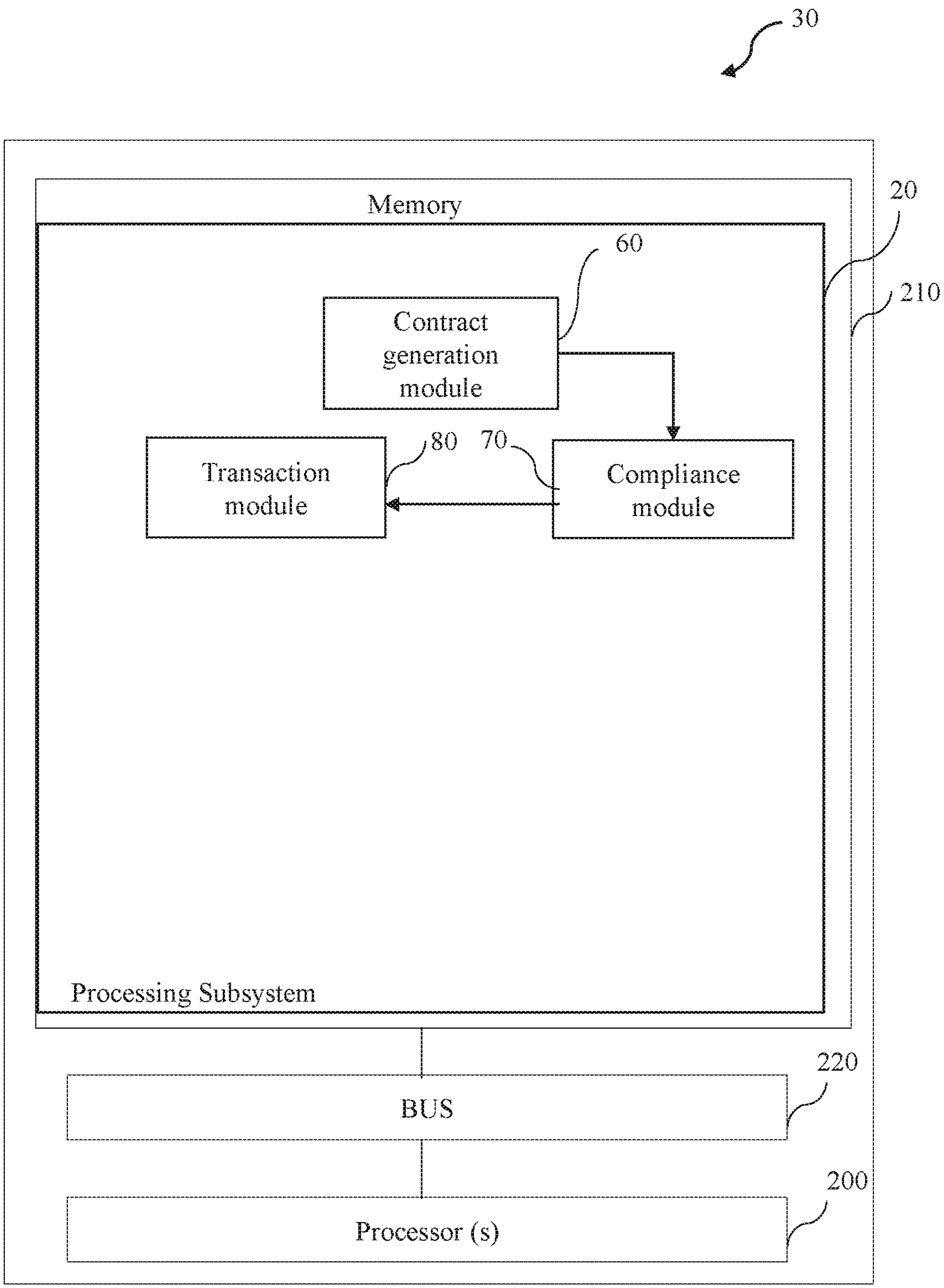
FIG. 3 is a block diagram of a computer or a server in accordance with an embodiment of the present disclosure.

FIG. 3 is a block diagram of a computer or a server 30 in accordance with an embodiment of the present disclosure. The server 30 includes processor(s) 200, and memory 210 operatively coupled to the bus 220. The processor(s) 200, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor to perform the method steps illustrated in FIG. 1. The memory 210 is substantially similar to the system 10 of FIG. 1. The memory 210 has the following subsystems: the processing subsystem 20 including the contract generation module 60, the compliance module 70, and the transaction module 80. The plurality of modules of the processing subsystem 20 performs the functions as stated in FIG. 1. The bus 220 as used herein refers to be the internal memory channels or computer network that is used to connect computer components and transfer data between them. The bus 220 includes a serial bus or a parallel bus, wherein the serial bus transmit data in bit-serial format and the parallel bus transmit data across multiple wires. The bus 220 as used herein, may include but not limited to, a system bus, an internal bus, an external bus, an expansion bus, a frontside bus, a backside bus, and the like.

The processing subsystem 20 includes a contract generation module 60 configured to generate a contract between the plurality of parties based on one or more preferences provided by the plurality of parties and a plurality of information fetched from at least one of a contract database, an appending database, and a search engine database associated with at least one of the plurality of parties. The contract includes one or more predefined conditions. The plurality of parties includes a brand, an influencer and one or more followers. The contract generation module 60 is also configured to receive corresponding electronic signatures from the plurality of parties to create a signed contract. The contract generation module 60 is further configured to generate one or more first non-fungible tokens based on a hash value of the signed contract to append the signed contract in a blockchain network. The processing subsystem 20 also includes a compliance module 70 operatively coupled to the contract generation module 60. The compliance module 70 is configured to invoke the one or more predefined conditions based on at least one of a geographical location of the influencer, and a type of the influencer. The compliance module 70 is also configured to evaluate an advertisement revenue based on the one or more predefined conditions, and an engagement score of a social media post made by the influencer. The compliance module 70 is further configured to generate one or more second non fungible tokens based on the advertisement revenue evaluated to append the one or more second non-fungible tokens into the blockchain network. The processing subsystem 20 also includes a transaction module 80 operatively coupled to the compliance module 70. The transaction module 80 is configured to issue a receipt of a transaction to the plurality of parties upon performing a transaction associated with the one or more second nonfungible tokens by the plurality of parties, thereby managing the contract between the plurality of parties.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 200.

Figure 4:
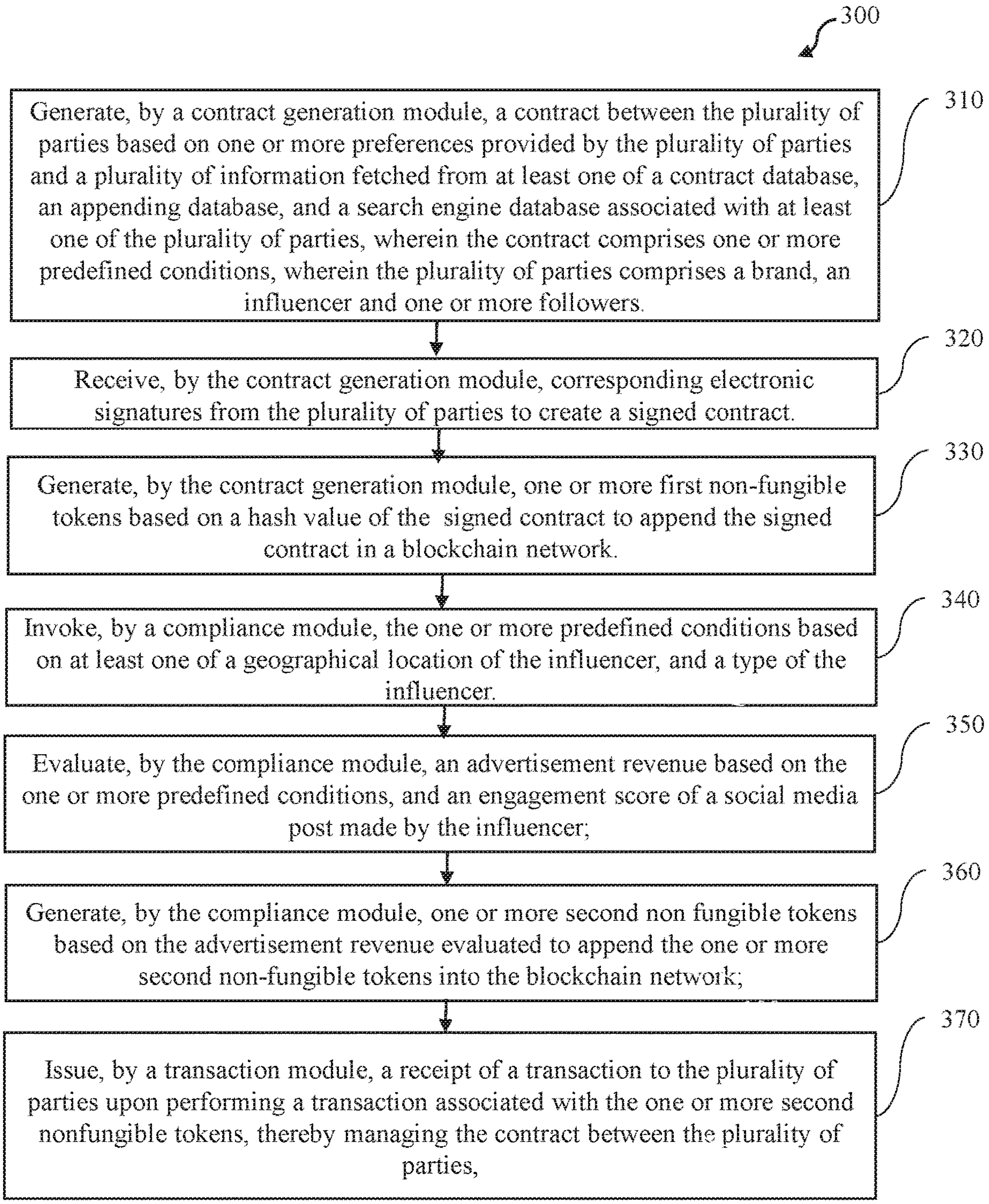
FIG. 4 is a flow chart representing the steps involved in a method to manage a contract between a plurality of parties in accordance with an embodiment of the present disclosure.

FIG. 4 is a flow chart representing the steps involved in a method 300 to manage a contract between a plurality of parties in accordance with an embodiment of the present disclosure. The method 300 includes generating a contract between the plurality of parties based on one or more preferences provided by the plurality of parties and a plurality of information fetched from at least one of a contract database, an appending database, and a search engine database associated with at least one of the plurality of parties in step 310. In one embodiment, generating a contract between the plurality of parties based on one or more preferences provided by the plurality of parties and a plurality of information fetched from at least one of a contract database, an appending database, and a search engine database associated with at least one of the plurality of parties includes generating a contract between the plurality of parties based on one or more preferences provided by the plurality of parties and a plurality of information fetched from at least one of a contract database, an appending database, and a search engine database associated with at least one of the plurality of parties, by a contract generation module.

Further, the contract includes one or more predefined conditions. The plurality of parties includes a brand, an influencer and one or more followers. In one embodiment, the contract may include a copyright contract between the brand and the influencer, a membership contract between the one or more followers and the influencer, and a royalty sharing contract between the brand, the influencer, and the one or more followers. In one embodiment, the one or more preferences may include scope of work, content guidelines, exclusivity, timeline, payment terms, copyright terms, usage rights, performance metrics, compliance condition, termination condition, dispute resolution condition, service details. In a specific embodiment, the contract database may include the plurality of information about a plurality of terms comprising influencer, copyrights, brand ambassador, currency, non-disclosure agreements, non-fungible tokens, minting, payouts, taxes, general data protection regulation, cookies, health inductance portability, and payment card industry data security standard, contract creator payment terms, approval process. confidential information, exclusivity rights. governing laws, applicable laws, ftc guidelines. In one embodiment, the contract generation module may utilize a machine learning model trained on a diverse set of contracts including various industries and types of agreements to generate the contact based on the one or more preferences of the plurality of parties.

In one embodiment, the appending database may include information regarding one or more application programming interfaces. In some embodiments, the search engine database comprises a plurality of hashtags aggregated from one or more social media platforms associated with the influencer through an aggregator. The contract includes one or more predefined conditions. In one embodiment, the one or more predefined conditions may include, but are not limited to, the scope of work, the content guidelines, the exclusivity, the timeline, the payment terms, the copyright terms, trademark terms, the usage rights, the performance metrics, the compliance condition, the termination condition, the dispute resolution condition, and the service details.

The method 300 also includes receiving corresponding electronic signatures from the plurality of parties to create a signed contract in step 320. In one embodiment, receiving corresponding electronic signatures from the plurality of parties to create a signed contract includes receiving corresponding electronic signatures from the plurality of parties to create a signed contract, by the contract generation module.

The method 300 also includes generating one or more first non-fungible tokens based on a hash value of the signed contract to append the signed contract in a blockchain network in step 330. In one embodiment, generating one or more first non-fungible tokens based on a hash value of the signed contract to append the signed contract in a blockchain network includes generating one or more first non-fungible tokens based on a hash value of the signed contract to append the signed contract in a blockchain network, by the contract generation module. In one embodiment, the blockchain network may include a public blockchain network. In some embodiments, the blockchain network may include a private blockchain network. In one embodiment, the blockchain network may include a shared blockchain network.

The method 300 also includes invoking the one or more predefined conditions based on at least one of a geographical location of the influencer, and a type of the influencer in step 340. In one embodiment, invoking the one or more predefined conditions based on at least one of a geographical location of the influencer, and a type of the influencer includes invoking the one or more predefined conditions based on at least one of a geographical location of the influencer, and a type of the influencer, by a compliance module. In one embodiment, the type of the influencer may include macro influencer, micro influencer, nano influencer, celebrity influencer, industry influencer, lifestyle influencer, fashion influencer, fitness influencer, travel influencer, parenting influencer, food influencer, gaming influencer, political influencer.

The method 300 also includes evaluating an advertisement revenue based on the one or more predefined conditions, and an engagement score of a social media post made by the influencer in step 350. In one embodiment, evaluating an advertisement revenue based on the one or more predefined conditions, and an engagement score of a social media post made by the influencer includes evaluating an advertisement revenue based on the one or more predefined conditions, and an engagement score of a social media post made by the influencer by the compliance module. In one embodiment, the compliance module may be configured to evaluate the engagement score of the social media post based on number of likes secured by the social media post including a plurality of hash tags, number of comments secured by the social media post including the plurality of hash tags, number of shares secured by the social media post including the plurality of hash tags, and number of impressions secured by the social media post including the plurality of hash tags.

The method 300 also includes generating one or more second non fungible tokens based on the advertisement revenue evaluated to append the one or more non-fungible tokens into the blockchain network in step 360. In one embodiment, generating one or more second non fungible tokens based on the advertisement revenue evaluated to append the one or more non-fungible tokens into the blockchain network includes generating one or more second non fungible tokens based on the advertisement revenue evaluated to append the one or more non-fungible tokens into the blockchain network by the compliance module.

The method 300 further includes issuing a receipt of a transaction to the plurality of parties upon performing a transaction associated with the one or more second nonfungible tokens by the plurality of parties, thereby managing the contract between the plurality of parties in step 370. In one embodiment, issuing a receipt of a transaction to the plurality of parties upon performing a transaction associated with the one or more second nonfungible tokens by the plurality of parties, thereby managing the contract between the plurality of parties includes issuing a receipt of a transaction to the plurality of parties upon performing a transaction associated with the one or more second nonfungible tokens by the plurality of parties, thereby managing the contract between the plurality of parties by a transaction module. In one embodiment, the receipt may include a plurality of information including status of the transaction, quantify of the one or more non fungible tokens ordered by the influencer, status of an order, order schedule, quantify of the one or more non fungible tokens appended to the blockchain network.

Various embodiments of the system and method to manage a contract between a plurality of parties described above enable various advantages. The contract generation module is capable of generating the contract between the plurality of parties based on the one or more preferences provided by the plurality of parties and the plurality of information fetched from the at least one of the contract database, the appending database, and the search engine database associated with at least one of the plurality of parties, thereby providing a way to draft and sign the contract irrespective of the physical presence of the plurality of parties. The contract generation module is capable of generating the contract incorporate mutually agreeable clauses within minimum possible time thereby making reducing the amount of human workforce required otherwise. The compliance module is capable of invoking the one or more predefined conditions of the contract based on the geographical location of the influencer, and the type of the influencer, thereby ensuring easy enforcement of the contract. Also, by appending the signed contract and the advertisement revenue in the blockchain network, the system is capable of ensuring transparency and accountability between the plurality of parties.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system to manage a contract between a plurality of parties comprising:
- a hardware processor;
- a blockchain network coupled to the hardware processor; and
- a memory coupled to the hardware processor, wherein the memory comprises a set of program instructions in the form of a plurality of modules, configured to be executed on a network to control bidirectional communications among the plurality of modules by the hardware processor, wherein the plurality of modules comprises:
  - a contract generation module configured to:
    - generate a contract between the plurality of parties based on one or more preferences provided by the plurality of parties and a plurality of information fetched from at least one of a contract database, an appending database, and a search engine database associated with at least one of the plurality of parties,
    - wherein the contract generation module utilizes a machine learning model trained on a diverse set of contracts including various industries and types of agreements to generate the contract based on the one or more preferences of the plurality of parties,
    - wherein the contract comprises one or more predefined conditions, wherein the plurality of parties comprises a brand, an influencer and one or more followers;
    - receive corresponding electronic signatures from the plurality of parties to create a signed contract;
    - generate one or more first non-fungible tokens based on a hash value of the signed contract, and append the signed contract in the blockchain network;
  - a compliance module operatively coupled to the contract generation module, wherein the compliance module is configured to:
    - invoke the one or more predefined conditions based on at least one of a geographical location of the influencer, and a type of the influencer;
    - evaluate an advertisement revenue based on the one or more predefined conditions, and an engagement score of a social media post made by the influencer;
    - generate one or more second non-fungible tokens based on the advertisement revenue evaluated, and append the one or more second non-fungible tokens into the blockchain network;
  - a transaction module operatively coupled to the compliance module, wherein the transaction module is configured to issue a receipt of a transaction to the plurality of parties upon performing a transaction associated with the one or more second non-fungible tokens by the plurality of parties, thereby managing the contract between the plurality of parties.

2. The system of claim 1, wherein the blockchain network comprises a public blockchain network.

3. The system of claim 1, wherein the blockchain network comprises a private blockchain network.

4. The system of claim 1, wherein the blockchain network comprises a shared blockchain network.

5. The system of claim 1, wherein the receipt comprises a plurality of information comprising status of the transaction, quantify of the one or more non-fungible tokens ordered by the influencer, status of an order, order schedule, quantify of the one or more non-fungible tokens appended to the blockchain network.

6. The system of claim 1, wherein the one or more preferences comprises scope of work, content guidelines, exclusivity, timeline, payment terms, usage rights, performance metrics, compliance condition, termination condition, dispute resolution condition, service details.

7. The system as claimed in claim 1, wherein when the plurality of information is fetched from the contract database, the contract database comprises information about a plurality of terms comprising influencer, copyrights, brand ambassador, currency, non-disclosure agreements, non-fungible tokens, minting, payouts, taxes, general data protection regulation, cookies, health inductance portability and accountability act, payment card industry data security standard.

8. The system of claim 1, wherein when the plurality of information is fetched from the appending database, the appending database comprises information regarding one or more application programming interfaces.

9. The system of claim 1, wherein when the plurality of information is fetched from the search engine database, the search engine database comprises a plurality of hashtags aggregated from one or more social media platforms associated with the influencer through an aggregator.

10. The system of claim 1, wherein the type of the influencer comprises macro influencer, micro influencer, nano influencer, celebrity influencer, industry influencer, lifestyle influencer, fashion influencer, fitness influencer, travel influencer, parenting influencer, food influencer, gaming influencer, political influencer.

11. The system of claim 1, wherein the compliance module is configured to evaluate the engagement score of the social media post based on number of likes secured by the social media post including a plurality of hash tags, number of comments secured by the social media post including the plurality of hash tags, number of shares secured by the social media post including the plurality of hash tags, and number of impressions secured by the social media post including the plurality of hash tags.

12. The system of claim 1, wherein the contract comprises a copyright contract between the brand and the influencer, a membership contract between the one or more followers and the influencer, and a royalty sharing contract between the brand, the influencer, and the one or more followers.

13. The system of claim 1, wherein the contract database, the appending database, and the search engine database are structured query language databases.

14. The system of claim 1, wherein the contract database, the appending database, and the search engine database are non-structured query language databases.

15. A method to manage a contract between a plurality of parties comprising:

generating, by a contract generation module, a contract between the plurality of parties based on one or more preferences provided by the plurality of parties and a plurality of information fetched from at least one of a contract database, an appending database, and a search engine database associated with at least one of the plurality of parties, wherein generating the contract comprises utilizing, by the contract generation module, a machine learning model trained on a diverse set of contracts including various industries and types of agreements to generate the contract based on the one or more preferences of the plurality of parties, wherein the contract comprises one or more predefined conditions, wherein the plurality of parties comprises a brand, an influencer and one or more followers;

receiving, by the contract generation module, corresponding electronic signatures from the plurality of parties to create a signed contract;

generating, by the contract generation module, one or more first non-fungible tokens based on a hash value of the signed contract, and appending the signed contract in a blockchain network communicatively coupled to the contract generation module;

invoking, by a compliance module, the one or more predefined conditions based on at least one of a geographical location of the influencer, and a type of the influencer;

evaluating, by the compliance module, an advertisement revenue based on the one or more predefined conditions, and an engagement score of a social media post made by the influencer;

generating, by the compliance module, one or more second non-fungible tokens based on the advertisement revenue evaluated, and appending the one or more non-fungible tokens into the blockchain network; and issuing, by a transaction module, a receipt of a transaction to the plurality of parties upon performing a transaction associated with the one or more second non-fungible tokens by the plurality of parties, thereby managing the contract between the plurality of parties.

16. A non-transitory computer-readable medium storing a computer program that, when executed by a processor, causes the processor to perform a method to manage a contract between a plurality of parties comprising:

generating, by a contract generation module, a contract between the plurality of parties based on one or more preferences provided by the plurality of parties and a plurality of information fetched from at least one of a contract database, an appending database, and a search engine database associated with at least one of the plurality of parties, wherein generating the contract comprises utilizing, by the contract generation module, a machine learning model trained on a diverse set of contracts including various industries and types of agreements to generate the contract based on the one or more preferences of the plurality of parties, wherein the contract comprises one or more predefined conditions, wherein the plurality of parties comprises a brand, an influencer and one or more followers;

receiving, by the contract generation module, corresponding electronic signatures from the plurality of parties to create a signed contract;

generating, by the contract generation module, one or more first non-fungible tokens based on a hash value of the signed contract, and appending the signed contract in a blockchain network;

invoking, by a compliance module, the one or more predefined conditions based on at least one of a geographical location of the influencer, and a type of the influencer;

evaluating, by the compliance module, an advertisement revenue based on the one or more predefined conditions, and an engagement score of a social media post made by the influencer;

generating, by the compliance module, one or more second non-fungible tokens based on the advertisement revenue evaluated, and appending the one or more non-fungible tokens into the blockchain network; and issuing, by a transaction module, a receipt of a transaction to the plurality of parties upon performing a transaction associated with the one or more second non-fungible tokens by the plurality of parties, thereby managing the contract between the plurality of parties.

* * * * *